United States Patent Office 3,269,272
Patented August 30, 1966

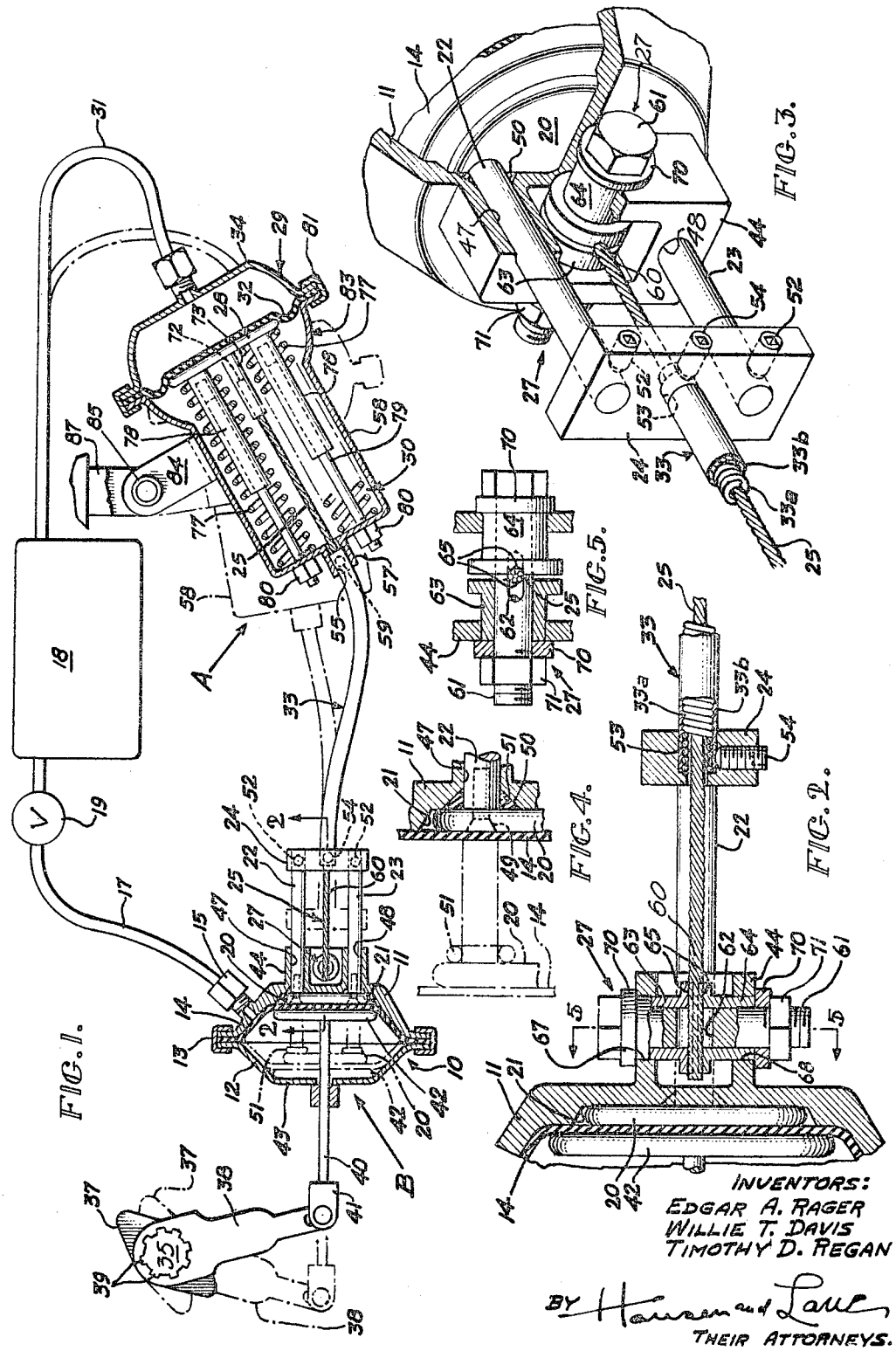

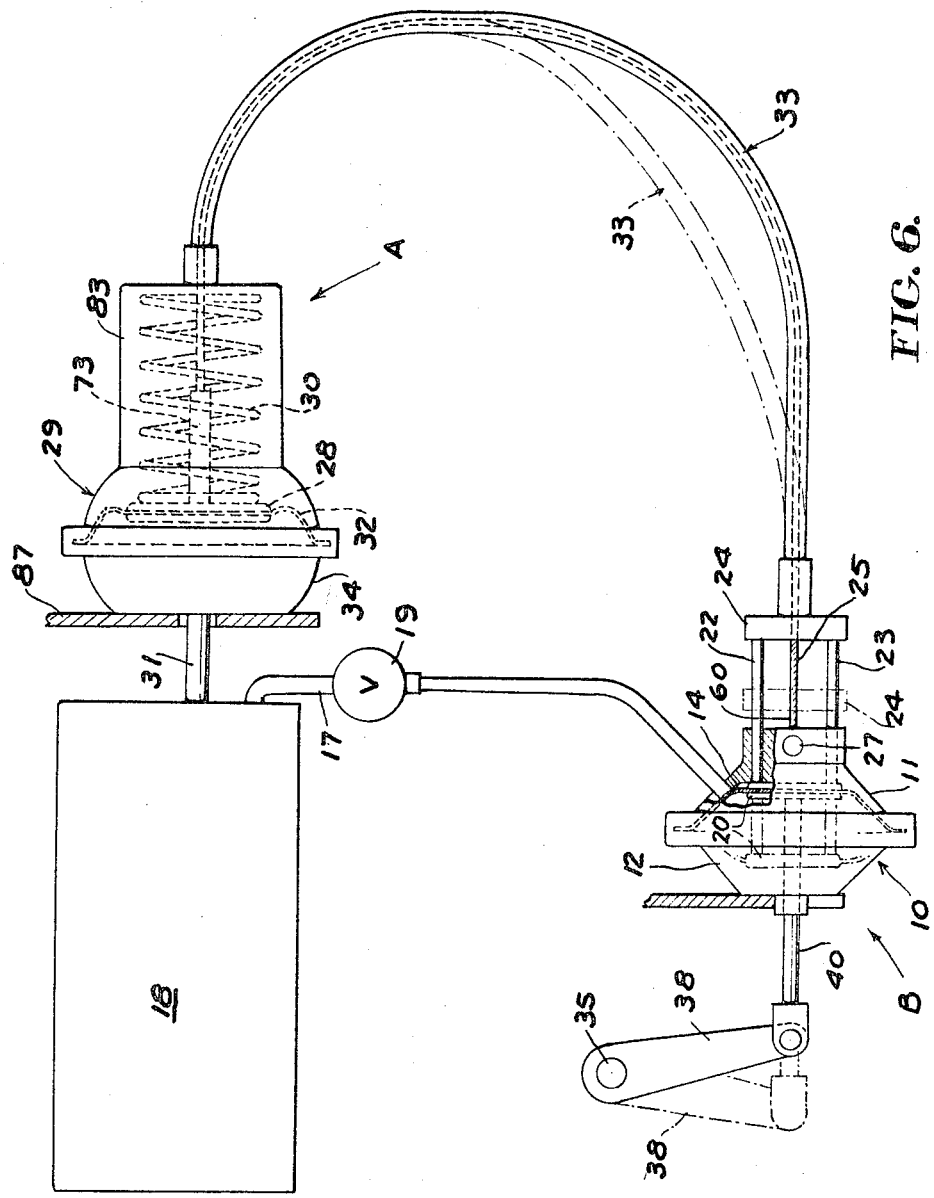

3,269,272
REMOTE MOUNTED AUXILIARY BRAKE
APPLICATOR
Edgar A. Rager, Los Gatos, Willie T. Davis, San Jose, and Timothy D. Regan, Burlingame, Calif., assignors to Neway Equipment Company, Muskegon, Mich., a corporation of Michigan
Filed May 3, 1965, Ser. No. 456,026
17 Claims. (Cl. 91—170)

This application is a continuation-in-part of our application Serial No. 319,455, filed Oct. 28, 1963, now abandoned, entitled, "Remote Mounted Auxiliary Brake Applicator."

The present invention relates to air brakes for trucks and trailers and pertains more particularly to a fail-safe auxiliary brake-actuating mechanism for setting the brakes of a truck or trailer equipped with air brakes upon failure of the air supply or for use as a parking brake.

It is not broadly new to provide auxiliary brake-applying mechanism for trucks and trailers equipped with conventional air-brake systems, which auxiliary mechanism sets the brakes upon failure of the air supply to the conventional braking system and which also serves as a parking brake when the vehicle is at rest. Such an auxiliary system is shown, for example, in Hovell Patent No. 3,090,652. Other such systems provide a spring-actuated, air-pressure-released mechanism which is mounted directly on the air cylinder, or air pot as it is generally referred to, of the regular braking system. Such direct-mounted auxiliary brake-actuating mechanisms are referred to in the industry as "piggy-back" auxiliary brake actuators.

The under-body zone of most trucks and trailers in the vicinity of the axles where the air pots of conventional air brake systems are mounted is usually quite crowded; and the air pots are usually mounted on brackets secured to the axles by welding. Therefore, only a relatively small percentage of existing trucks and trailers are capable of having such prior auxiliary mechanisms mounted thereon without requiring extensive and expensive adaptations. In fact, on some trucks and trailers there is simply not room enough available adjacent the brakes for mounting such prior mechanisms. Also, on the direct-mounted "piggy-back" mechanisms, the weight thereof, added to that of the existing air pot, creates forces which accelerate fatigue and result in the possibility of the entire pot breaking off and thus rendering the brake completely inoperative.

An object of the present invention is to provide relatively simple, inexpensive, improved auxiliary air-brake-actuating mechanism which can be readily mounted on any known air-brake-equipped truck or trailer and which can be mounted either close to the primary air pot of such trucks and trailers or at a substantial distance remote therefrom and wherein it is not necessary to mount the auxiliary brake-actuating mechanism in line with, or even in the same direction as, the piston movement of the primary air pot.

In general, the invention contemplates the use of an auxiliary air pot having a piston to which one end of a cable is attached, the other end of the cable being secured to the body of the primary air pot. The cable has a longitudinal compression housing anchored at one end to the auxiliary pot body, the other end of the housing being secured in thrust-transmitting relation to the brake-actuating piston in the primary pot. The auxiliary pot, cable, and compression housing are arranged so that upon relative movement of the auxiliary pot and its piston in opposite directions, the compression housing effects brake-applying and -releasing movement of the primary pot piston. The auxiliary pot piston is spring-biased toward movement in a brake-applying direction but is held in brake-released position by air pressure for so long as there is sufficient pressure in the system to operate the vehicle brakes in a normal manner.

In the accompanying drawings:

FIG. 1 is a view, partly in side elevation and partly in longitudinal medial section, of an air pot and brake-arm assembly of the regular air-brake system of a truck or trailer, with an auxiliary air-brake mechanism embodying the present invention incorporated therewith, the solid lines showing the auxiliary mechanism in compressed-air-actuated, brake-releasing condition, and the broken lines showing such auxiliary mechanism in spring-actuated, brake-setting condition.

FIG. 2 is an enlarged, fragmentary sectional view taken along line 2—2 of FIG. 1.

FIG. 3 is a similarly enlarged, perspective view of the fragmentary portions shown in FIG. 2, a portion of the replacement housing member being broken away.

FIG. 4 is a similarly enlarged, fragmentary, sectional view showing the left-hand end portion of the upper thrust rod as shown in FIG. 1, the parts being shown in air-actuated, brake-releasing condition in solid lines, and in spring-actuated, brake-setting position in broken lines.

FIG. 5 is a fragmentary sectional view taken along line 5—5 of FIG. 2, portions being broken away.

FIG. 6 is a partly diagrammatic elevational view of a modified form of the invention with portions shown in section and in phantom.

Briefly, the illustrative embodiment of the present invention comprises an auxiliary brake-actuating mechanism A (FIG. 1) which can be readily incorporated with the regular air brake system B of an air-brake-equipped vehicle such as a truck or trailer. In mounting the auxiliary mechanism A on such a vehicle, the outer, or right-hand half as shown in FIG. 1 of the air pot 10 of the regular air-brake mechanism is removed and is replaced by a modified air pot housing half member 11. The latter is secured to the pan-shaped original housing half member 12 by a usual channel clamp band 13, with the regular air brake diaphragm 14 gripped marginally in a conventional manner between the mating peripheral flanges of the two housing half members 11 and 12.

The replacement housing member 11 is shaped internally to conform to the diaphragm 14 when the latter is in normal, unactuated condition as shown in solid lines in FIG. 1 and is provided with a usual threaded fitting 15 for attaching the compressed air line 17 from the usual compressed air tank 18 to actuate the diaphragm 14 upon controlled operation of the regular air-brake control valve 19 for normal operation of the brakes.

A pressure pad or piston 20 is mounted in a recess 21 provided therefor in the head of the replacement housing member 11 and is connected to the ends of a pair of thrust rods 22 and 23 which are mounted for axial slidable movement in the head of the replacement housing member 11. A cross head 24 is mounted transversely of the outer ends of the thrust rods.

A cable 25 is anchored at one end by a pivoted clamp member 27 to the replacement housing member 11 and at the other end to the piston 28 of an auxiliary air pot 29. Powerful, resilient means 30 bias the piston 28 of the auxiliary pot 29 toward the right as shown in FIG. 1, thereby biasing the pot 29 toward the left as illustrated in broken lines in FIG. 1, while compressed air from the tank 18, passing through an air line 31 into the auxiliary pot 29, and acting on a diaphragm 32 provided therein, urges the auxiliary piston 28 in the opposite direction.

A flexible, but endwise incompressible, compression housing 33 encloses the portion of the cable 25 between the cross head 24 and the body of auxiliary pot 29, and is mounted for thrust engagement with both of these members.

When air at brake-operating pressure is present in tank 18, line 31, and auxiliary pot 29, diaphragm 32 and piston 28 are held in their FIG. 1 position against the action of spring means 30. Tension in cable 25 and compression in housing 33 are relieved.

When air pressure in auxiliary pot 29 is relieved, spring means 30 urge auxiliary piston 28 toward bottomed condition on auxiliary pot housing member 34, thereby placing cable 25 under powerful tension and urging auxiliary pot 29 bodily toward the left as FIG. 1 is viewed. Pot 29, cable 25, and compression housing 33 are so arranged that when this happens, the compression housing exerts brake-applying thrust on cross head 24. For this purpose, in the specific form of the invention illustrated, auxiliary pot 29 is mounted on a pivot which facilitates bodily movement thereof from the solid-line position of FIG. 1 to the broken line position, as is discussed more in detail below.

Referring to the drawings in greater detail, the usual brake-actuating cam shaft 35 of a truck or trailer upon which the illustrative mechanism is to be mounted is provided with a usual brake-actuating cam 37 and a brake arm or slack adjuster 38 having conventional, splined connection at 39 with the cam shaft 35. The regulator piston rod 40 has conventional, adjustable, pivotal connection at 41 with the brake arm 38, and the usual flat piston 42 is mounted on the other end of the piston rod 40 within the air cylinder or pot 10 of the regular braking system. It is to be understood that rod 40 can be connected with other types of brake mechanisms such as, for example, those utilizing a wedge structure rather than cam 37 and slack adjuster 38.

The regular air pot 10 comprises a housing which usually consists of two pan-shaped half portions, one of which 43 is shown in FIG. 1. The other original housing half portion, not shown, was removed in installing the present auxiliary braking mechanism A and is replaced by the housing half member 11, which is modified for use with the present invention in a manner which will be made apparent later herein.

The regular pot diaphragm 14, which conventionally is of fabric-reinforced rubber or neoprene, is shaped to fit the interior of the replacement housing member 11 and overlies the piston 42. For normal brake operation, controlled actuation of the regular brake valve 19 admits compressed air from the tank 18 through the line 17 into the space between the replacement housing member 11 and the diaphragm 14, so that the regular operation of the brakes remains virtually unchanged.

Referring now to the novel features of the illustrated embodiment of the invention, a rectangular, elongated enclosure wall 44 is formed integrally on the outer side of the head of the replacement housing member 11, and a pair of axially parallel holes 47 and 48 are provided through opposite end portions of this wall. As best shown in FIG. 1, these holes 47 and 48 are also axially parallel to the regular piston rod 40.

The two thrust rods 22 and 23 are fitted for axially slidable movement, one in each of these holes 47 and 48, and the inner, or left hand ends, of these thrust rods, as shown in FIGS. 1 and 4, are secured by screws 49 to the pad 20. The latter may be of steel plate and fits flush into the recess 21 provided therefor in the head of the replacement housing member 11.

The inner ends of the rod-receiving holes 47 and 48 are countersunk as at 50 (FIGS. 3 and 4) to receive in compression a pair of O-rings 51, one of which is provided around each of the thrust rods 22 and 23 between the housing member 11 and the pad 20. When the pad 20 and thrust rods 22 and 23 are in their right hand, brake-releasing, solid-line position of FIGS. 1 and 4, these O-rings 51 are compressed tightly in sealing relation in the countersunk portions 50 of the holes 47 and 48 to effectively seal them against the escape of air from the interior of the regular pot 10 during normal operation of the brakes.

The cross head 24 is mounted transversely of the outer or right hand ends of the thrust rods 22 and 23, as shown in FIGS. 1 and 2, the thrust rods being fitted into holes provided therefor in the cross head and secured therein by set screws 52, as best shown in FIG. 3.

The flexible compression housing 33 comprises a closed helix 33a of strong spring wire having a bore of a size to admit the cable 25 for axial slidable movement therein. The helix 33a of the thrust housing 33 preferably is provided with a weatherproof sheath 33b of suitable material, such as neoprene, which may be bonded thereto. The length of the compression housing 33 is determined by the location of the auxiliary pot 29 relative to the cross head 24, and a wide variation in this length and the relative angular positions of the two pots 10 and 29 is permissible.

One end of the compression housing 33 is seated on the offset shoulder of a counterbored hole 53, best illustrated in FIG. 2, in the cross head 24 and is firmly anchored in position by a set screw 54. The other end of the thrust housing 33 is similarly seated on the shoulder of a counterbored hole 55 provided therefor in a boss 37 provided centrally of the bottom of a spring-housing portion 58 of the auxiliary pot 29 and is also secured in position by a set screw 59 (FIG. 1).

The cable 25 passes through the compression housing 33, as best shown in FIGS. 2 and 3, and extends therebeyond at both ends. The cable has one end portion 60 firmly anchored to the wall 44 on the replacement housing member 11 by the pivotally mounted cable clamp assembly 27, which is similar to that disclosed in our copending application Serial No. 221,077 filed Sept. 4, 1962. This cable clamp 27 comprises a bolt 61 having an elongated hole 62 therein of a size to receive the cable 25.

A pair of similar, end flanged, cylindrical cable clamp members 63 and 64 are mounted in relatively endwise reversed relation on the bolt 61, the bore of each of these members being of a size to fit slidably onto the shank of the bolt. A groove 65, of a depth less than half the diameter of the cable 25, is provided transversely across the inner end of each of the clamp members 63 and 64.

In assembling the cable clamp 27, the two flanged cylindrical members 63 and 64 are inserted from the inner side of the wall 44 into a pair of axially aligned holes 67 and 68 provided therefor in opposite sides of the wall. With a washer 70 of greater diameter than the holes 67 and 68 mounted coaxially on the outer end of each of the clamp members 63 and 64, the bolt 61 is inserted axially through the aligned washers and clamps as shown in FIG. 5.

The end 60 of the cable 25 is inserted between the inner ends of the flanged clamp members 63 and 64 and through the elongated hole 62 in the bolt 61; and with the cable-receiving grooves 65 fitted over the cable 25, a nut 71 is threaded onto the bolt 61 and is drawn down tightly to force the clamp members 63 and 64 into firm, clamping engagement with the cable 25. The elongation of the hole 62 in the bolt prevents any cutting of the cable. This cable clamp 27 firmly secures the end of the cable to the replacement housing member 11 and at the same time permits the cable to flex without kinking if necessary. It also insures that the cable end will lie fair and true when the cable is under tension.

The other end of the cable 25 is fitted into a hole 72 (indicated in dotted lines in FIG. 1) provided therefor axially of a stem member 73 secured coaxially to the auxiliary pot piston 28. The cable 25 is securely swaged into the stem 73 in a well-known manner.

The auxiliary pot housing comprises the conventional, pan-shaped housing member 34 and the oppositely positioned, elongated spring housing member 58. The interior of the auxiliary housing member 34 is formed to fit the auxiliary diaphragm 32 when the latter is in its right hand, spring-pressed condition, similarly to that of the regular brake diaphragm 14 as illustrated in solid lines in FIG. 1. The air line 31 comprises a high-pressure hose of a conventional type used in air brake work and communicates the interior of the air tank 18 with the space between the auxiliary housing member 34 and the auxiliary diaphragm 32.

The elongated spring housing member 58 encloses the powerful, resilient, biasing means for the auxiliary piston 28, which means, as illustrated, comprise a plurality of helically coiled springs 77 mounted in compression between the auxiliary piston 28 and the head of the elongated spring housing member 58. Each of these springs is mounted coaxially around a guide tube 78 which is fixedly secured to the auxiliary piston 28 and a guide rod 79 which is screwed into a nut 80 welded onto the outer surface of the elongated housing member 75. Each rod 79 is slidably inserted in the bore of one of the cooperating tubular guide members 78, and all of the members of each spring assembly, including the helical spring 77, its guide tube 78, and guide rod 79, are axially parallel to the axis of the auxiliary piston 34 and its cable stem 73.

The auxiliary pot housing members 34 and 58 are of equal diameter at their mating flanges and are secured together coaxially and in relatively reversed relation with the marginal portion of the auxiliary diaphragm 32 gripped therebetween. An enclosing channel clamp band 81 secures these auxiliary pot housing members together in a conventional manner and similarly to the clamp band 13 for the two halves of the pot 10 of the regular braking mechanism.

In the form of the invention illustrated in FIG. 1, auxiliary pot housing 83 is secured to an arm 84 which is pivotally mounted on a pin 85 mounted on a fixed frame member 87 of the vehicle. This mounting arrangement permits housing 83 to swing back and forth in a plane perpendicular to the axis of the supporting pin 85 and generally lengthwise of the auxiliary pot.

In operation of the illustrated form of the invention, it may be assumed that initially the mechanism is in the condition shown in FIG. 1 wherein air under pressure has been valved out of primary pot 10 so that brake rod 40 and slack adjuster 38 are in the brakes-released position. Air under brake-operating pressure has been admitted into auxiliary pot 29, and the force of diaphragm 32 on piston 28 has partially compressed springs 70. Tension in cable 25 and compression in cable housing 33 are relieved. The service brakes are operated in the normal manner by valving air into and out of primary pot 10, thereby effecting movement of brake rod 40 and slack adjuster 38 between the solid- and broken-line positions of FIG. 1.

When pressure is lost or dangerously lowered in the pneumatic system, there is insufficient pressure to operate the service brakes in the normal manner. However, upon such a drop of pressure, the force exerted by auxiliary diaphragm 32 on piston 28 diminishes and springs 70 expand, resulting in relative movement between auxiliary piston 28 and auxiliary pot housing 83. Since cable end 60 is anchored to a substantially stationary portion of primary pot 10, the range of movement of auxiliary piston 28 relative to the primary pot is limited.

Therefore, where auxiliary pot 29 is pivotally mounted, as in FIG. 1, relative movement of the auxiliary pot and piston is manifested by movement of top 34 of the auxiliary pot toward piston 28 and a consequent bodily swinging of the auxiliary pot toward a position closer to primary pot 10 as illustrated in broken lines in FIG. 1. Cable housing 33 is thereby placed in compression so that it exerts thrust on yoke 24 which is transmitted through rods 22, 23, and pad 20 to primary pot piston 42 for advancing brake rod 40 and slack adjuster 38 to the broken-line, brakes-applied position of FIG. 1. Thus, auxiliary pot 29 and its associated parts provide a fail-safe, emergency brake applicator.

When proper brake-operating pressure is restored to the system, top 34 of auxiliary pot 29 is again forced away from auxiliary piston 28, thereby swinging the auxiliary pot 29 bodily away from primary pot 10 so that compression in cable housing 33 is relieved, permitting brake rod 40 and slack adjuster 38 to retract toward the right as FIG. 1 is viewed for releasing the brakes. The parts are then restored to the solid-line position of FIG. 1 and auxiliary pot 29 is conditioned for a subsequent cycle of emergency operation in the manner described.

It will be apparent that auxiliary pot 29 can be used for the purpose of setting and releasing the brakes for parking purposes simply by valving air under pressure into and out of the auxiliary pot.

From the drawings and the above description, it will be seen that the reaction to brake-applying force exerted by auxiliary pot 29 is not transmitted through pivotal mount 85 to the vehicle frame. To the contrary, the brake-applying force and the reaction thereto are contained within the auxiliary pot structure. In fact, the auxiliary pot would operate satisfactorily if pivot 85 were disconnected and the auxiliary pot were held by hand or even laid upon a shelf on the vehicle body. Upon relief and restoration of pressure within the auxiliary pot, the auxiliary pot would move bodily lineally toward and away from the primary air pot to apply and release the brakes as springs 70 and pressure in the auxiliary pot alternately overcome each other. Therefore, the support for the auxiliary pot can be relatively small and light weight.

FIG. 6 shows a modified form of the invention similar to the form described above except that auxiliary pot 29 is fixedly mounted on the supporting vehicle 87, and a certain amount of slack is left in cable 25 and compression housing 33 when the auxiliary pot is in the brakes-released condition shown in solid lines. The amount of this slack will be determined by the amount of relative movement necessary between auxiliary piston 28 and top 34 of the auxiliary port for applying and releasing the brakes.

Assuming that the auxiliary pot is fixedly mounted, such relative movement takes the form of movement of piston 28 toward and away from the stationary top 34 of the auxiliary port. When pressure in pot 29 is lost, spring-induced movement of piston 28 shortens the effective length of cable 25 between auxiliary pot housing 83 and anchored end 60 of the cable. The cable, in turn, exerts force on the compression housing in such a direction as to tend to shorten it. Since the housing is substantially incompressible, it moves in response to this force from the solid-line position to the dotted-line position of FIG. 6, thereby effectively taking up slack in the compression housing. This movement of the compression housing advances cross head 24, piston 20, thrust rod 40, and slack adjuster 38 from the solid-line position thereof to the dotted-line position, thereby applying the vehicle brakes. Upon restoration of pressure in auxiliary pot 39, tension in cable 25 is relieved so that it and housing 33 can return to their slackened or looped condition, enabling the brake mechanism to return to released condition.

The invention provides a simple, easily mounted, and highly effective auxiliary braking mechanism for trucks and trailers equipped with air brake systems. Flexible compression housing 33 and cable 25 may be of almost any required length and will operate satisfactorily through a substantial curve. Auxiliary pot 29 can be disposed in any convenient orientation. In fact, the auxiliary pot can, if required, be mounted in axially parallel relation to the regular brake-actuating pot 10 and facing oppositely thereto, and in such case the flexible compression housing 33 and its enclosed cable 25 will be curved through a 180 degree loop and back to the cross head 24.

Thus, the auxiliary pot 29 can be mounted at almost any desired location in the under body zone of a truck or trailer for maximum ease of installation and servicing. In particular, it should be noted that pots 29 need not be mounted on suspended portions of the vehicle (e.g., axles) along with the primary pots. Pots 29 can be mounted on the vehicle body or frame. Movement of an axle carrying a primary pot relative to a frame-supported auxiliary pot will have no influence on operation of the brakes. Since the additional weight of the mechanism required on the regular air pot 10 for the installation of the present invention is slight, it imposes no problems of increased crystallization and breakage of the regular air pot 10 and its supporting bracket.

Selection of a movable or fixed mount for auxiliary pot 29 will depend upon the nature and location of available space. For example, some installations may be able to accommodate bodily movement of the pot but not the larger slack loop required by a fixed mount and vice versa.

In practice of the invention, it may be desirable to incorporate into the system valving which would preclude application of braking force simultaneously by the primary and auxiliary air posts to avoid excessive brake thrust and consequent possible damage to the brake mechanism. However, such valving can be provided by persons ordinarily skilled in that art and is not disclosed herein, since it is not a part of the invention.

We claim:

1. A remote mounted auxiliary brake applicator for mounting on a vehicle having a compressed air supply and having brakes and regular air-brake-actuating equipment mounted thereon, which regular air-brake-actuating equipment includes a regular air pot comprising a pot housing and a compressed-air-actuated piston mounted for brake-actuating movement therein, together with valve means for controlling communication between the compressed air supply and the regular air pot for regular air operation of the vehicle brakes, said auxiliary brake applicator comprising, an auxiliary air pot comprising an auxiliary housing and a compressed-air-actuated auxiliary piston mounted for movement lengthwise therein, means mounting the auxiliary pot housing for limited movement lengthwise thereof relative to, and in spaced relation to, the regular air pot, anchor means anchoring the auxiliary pot piston to a fixed element of a vehicle upon which the regular air pot is mounted, compression means in endwise compressive relation with the auxiliary pot housing and with the piston of the regular air pot, powerful biasing means acting between the auxiliary pot housing and the auxiliary pot piston and urging the auxiliary pot housing in a direction to urge the compression means and the regular air pot piston toward brake-applying position, and means communicating the interior of the auxiliary air pot with the compressed air supply to urge the auxiliary pot piston in a direction to overcome the biasing effect of the biasing means and with a force greater than that of the biasing means when the compressed air supply is at brake-operating pressure, thereby to free the regular air pot piston for regular air operation of the brakes.

2. A remote mounted auxiliary brake applicator for mounting on a vehicle having a compressed air supply and having brakes and regular air-brake-actuating equipment mounted thereon, which regular air-brake-actuating equipment includes a regular air pot comprising a pot housing and a compressed-air-actuated piston mounted for brake-actuating movement therein, together with valve means for controlling communication between the compressed air supply and the regular air pot for regular air operation of the vehicle brakes, said auxiliary brake applicator comprising, an auxiliary air pot comprising an auxiliary pot housing and a compressed-air-actuated auxiliary piston mounted for movement lengthwise therein, means mounting the auxiliary pot housing for limited movement lengthwise thereof relative to, and in spaced relation to, the regular air pot, tension means connected at one end thereof to the auxiliary pot piston and at the other end thereof to a fixed element of a vehicle upon which the regular air pot is mounted, compression means in endwise compressive relation at one end thereof with the auxiliary pot housing and at the other end thereof with the piston of the regular air pot, powerful biasing means acting between the auxiliary pot housing and the auxiliary pot piston and urging the auxiliary pot housing in a direction to urge the compression means and the regular air pot piston toward brake-applying position, and means communicating the interior of the auxiliary air pot with the compressed air supply to urge the auxiliary pot piston in a direction to overcome the biasing effect of the biasing means and with a force greater than that of the biasing means when the compressed air supply is at brake-operating pressure, thereby to free the regular air pot piston for regular air operation of the brakes.

3. An arrangement according to claim 2 wherein the tension means is a cable and the compression means is a closed coil wire helix enclosing the cable.

4. A remote mounted auxiliary brake applicator for mounting on a vehicle having a compressed air supply and having brakes and regular air-brake-actuating equipment mounted thereon, which regular air-brake-actuating equipment includes a regular air pot comprising a pot housing and a compressed-air-actuated piston mounted for brake-actuating movement therein, together with valve means for controlling communication between the compressed air supply and the regular air pot for regular air operation of the vehicle brakes, said auxiliary brake applicator comprising, an auxiliary air pot comprising an auxiliary pot housing and a compressed-air-actuated auxiliary piston mounted for movement lengthwise therein, means mounting the auxiliary pot housing for limited movement lengthwise thereof relative to, and in spaced relation to, the regular air pot, a cable connected at one end thereof to the auxiliary pot piston and at the other end thereof to a fixed element of a vehicle upon which the regular air pot is mounted, a pressure pad sealed within the regular air pot and overlying an end of the regular air pot piston, a thrust rod connected to the pressure pad and extending in slidable sealed relation through the regular air pot housing, a flexible, tubular compression housing enclosing the cable and in compressive bearing engagement at one end thereof with the thrust rod and at the other end thereof with the auxiliary pot housing, powerful biasing means acting between the auxiliary pot housing and the auxiliary pot piston and urging the auxiliary pot housing in a direction to urge the compression housing, the thrust rod, the pressure pad, and the regular air pot piston toward brake-applying position, and means communicating the interior of the auxiliary air pot with the compressed air supply to urge the auxiliary pot piston in a direction to overcome the biasing effect of the biasing means and with a force greater than that of the biasing means when the compressed air supply is at brake-operating pressure, thereby to free the regular air pot piston for regular air operation of the brakes.

5. A remote mounted auxiliary brake applicator for mounting on a vehicle having a compressed air supply and having brakes and regular air-brake-actuating equipment mounted thereon, which regular air-brake-actuating equipment includes a regular air pot comprising a two-part pot housing, only one half of which is pressurized, and a compressed-air-actuated piston mounted for brake-actuating movement therein upon the admission of pressurized air to the pressurized half of the housing, together with valve means for controlling communication between the compressed air supply and the pressurized half of the housing for regular air operation of the vehicle brakes, said auxiliary brake applicator comprising, a replacement half housing for the pressurized side of the regular air pot and having a pressure pad recess therein,
    a pressure pad mounted in such a recess,
    a pair of thrust rods connected to the pressure pad and extending in slidable, sealed relation through the replacement half housing,
    an auxiliary air pot comprising an auxiliary pot housing and a compressed-air-actuated auxiliary piston mounted for movement lengthwise therein,
    means mounting the auxiliary pot housing for limited movement lengthwise thereof relative to, and in spaced relation to, the regular air pot,
    a cable connected at one end thereof to the auxiliary pot piston and at the other end thereof to a fixed element of a vehicle upon which the regular air pot is mounted,
    a flexible, tubular compression housing enclosing the cable and in compressive bearing engagement at one end thereof with the thrust rods exteriorly of the replacement half housing and at the other end thereof with the auxiliary pot housing,
    powerful biasing means acting between the auxiliary pot housing and the auxiliary pot piston and urging the axuiliary pot housing in a direction to urge the compression housing, the thrust rods, the pressure pad, and the regular air pot piston toward brake-applying position,
    and means communicating the interior of the auxiliary air pot with the compressed air supply to urge the auxiliary pot piston in a direction to overcome the biasing effect of the biasing means and with a force greater than that of the biasing means when the compressed air supply is at brake-operating pressure, thereby to free the regular air pot piston for regular air operation of the brakes.

6. An arrangement according to claim 5 wherein the connection between the cable and the fixed vehicle element is a clamp bolt free for pivotal movement relative to the fixed element.

7. A remote mounted auxiliary brake applicator for mounting on a vehicle equipped with a fluid-pressure brake-operating system which includes a source of fluid under pressure and a regular brake-operating motor actuated thereby, said motor having brake-operating thrust means, said auxiliary applicator comprising, an auxiliary motor having a housing and a fluid-pressure-actuated piston mounted for movement therein,
    means supporting said auxiliary motor on the vehicle upon which the regular brake-operating motor is mounted,
    anchor means anchoring the auxiliary piston to a substantially stationary member of said vehicle,
    compression means in compressive relation with the auxiliary motor housing and with said thrust means,
    powerful biasing means acting between the auxiliary motor housing and piston in such a direction as to tend to place said anchor means under tension,
    said compression means, responsive to relative movement of said auxiliary motor housing and piston induced by said biasing means, being operable to exert force on said thrust means in a brake-applying direction, and the auxiliary housing being effective to support reaction to said force,
    and means communicating said auxiliary motor with the source of fluid under pressure to urge the auxiliary piston in a direction to overcome the biasing effect of said biasing means, and with a force greater than that of the biasing means when said fluid is at brake-operating pressure, thereby to free the regular brake-operating motor for regular fluid-pressure operation of the brakes.

8. The auxiliary applicator defined in claim 7 wherein said auxiliary motor housing is supported for movement relative to said regular motor, said housing being so movable responsive to relative movement of said auxiliary housing and piston for exerting and relieving brake-applying force on said thrust means.

9. The auxiliary applicator defined in claim 8 wherein said auxiliary motor housing is pivotally supported on said vehicle.

10. The auxiliary applicator defined in claim 8 wherein said auxiliary motor housing is supported for generally lineal movement on said vehicle.

11. The auxiliary applicator defined in claim 7 wherein said regular brake-operating motor has a housing which comprises said substantially stationary member of said vehicle.

12. The auxiliary applicator defined in claim 11 wherein said regular brake-operating motor housing contains a fluid-pressure-actuated piston included in said thrust means, said compression means being operatively connected with the latter piston.

13. The auxiliary applicator defined in claim 12 wherein said anchor means comprises a flexible cable and said compression means comprises a housing within which said cable is slidable, said cable housing being flexible but longitudinally substantially incompressible.

14. The auxiliary brake applicator defined in claim 13 wherein the operative connection betwen said cable housing and latter-said piston comprises thrust rod means, said regular motor housing being apertured for slidable reception of said thrust rod means, said thrust rod means having means positioned in alignment with the latter-said piston for exerting brake-applying force thereon.

15. The auxiliary brake applicator defined in claim 14 wherein said thrust rod means comprises a plurality of thrust rods passing through a plurality of apertures in said regular motor housing.

16. The auxiliary applicator defined in claim 7 wherein said compression means has portions which are flexible,
    said auxiliary motor being supported by said supporting means in such a manner as to provide slack in said portions of said compression means when said biasing means has been overcome by fluid under pressure in said auxiliary motor,
    said anchor means having flexible portions constrained to move in lateral directions substantially with said flexible portions of said compression means but being free to move longitudinally relative to said portions of said compression means responsive to relative movement of said auxiliary housing and piston,
    said auxiliary motor and anchor means being operable to take up said slack responsive to relative movement of said auxiliary housing and piston induced by said biasing means,
    and said compression means being operable to exert said force on said thrust means responsive to taking up of said slack.

17. The auxiliary applicator defined in claim 16 wherein said auxiliary motor housing is substantially fixedly supported on said vehicle so that substantially all of said force exerted by said compression means on said thrust means is in response to taking up of said slack.

No references cited.

EUGENE G. BOTZ, *Primary Examiner.*